June 25, 1963 A. C. SANDOW 3,095,344
APPARATUS FOR ASSEMBLING NUTS AND WASHERS
Filed July 7, 1960 5 Sheets-Sheet 1
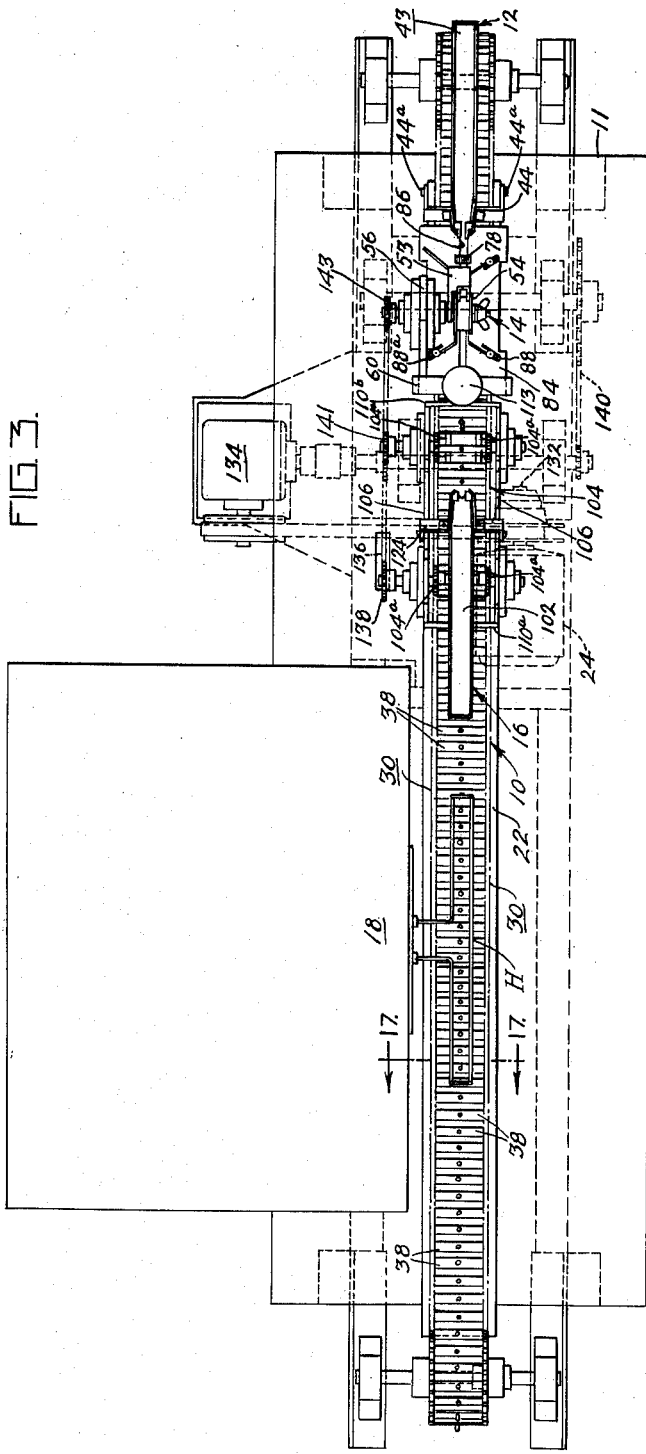
INVENTOR:
ALBERT C. SANDOW
BY
Howson & Howson
ATTYS.

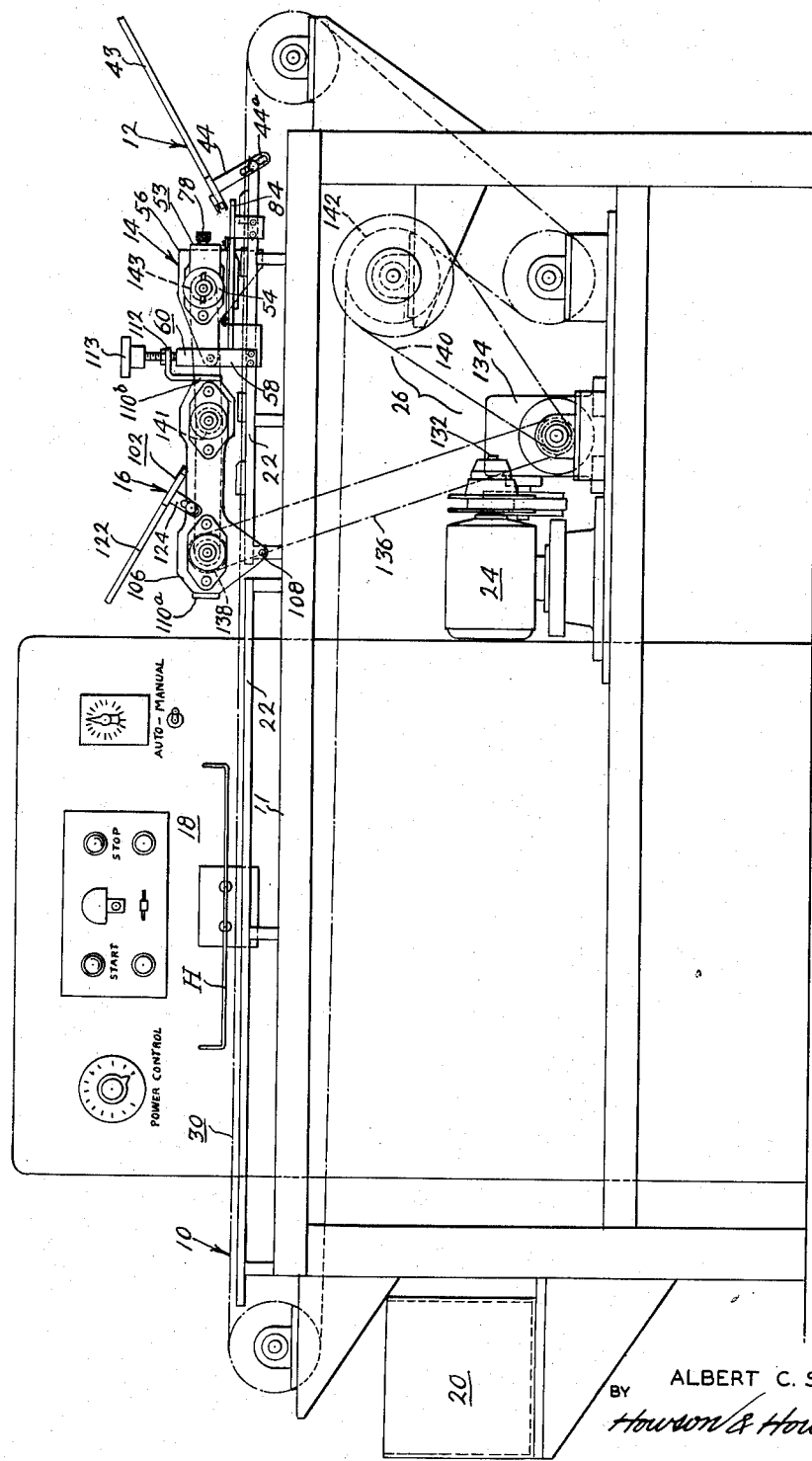

June 25, 1963

A. C. SANDOW 3,095,344

APPARATUS FOR ASSEMBLING NUTS AND WASHERS

Filed July 7, 1960

5 Sheets-Sheet 3

INVENTOR:
ALBERT C. SANDOW
BY
Howson & Howson
ATTYS.

June 25, 1963 A. C. SANDOW 3,095,344
APPARATUS FOR ASSEMBLING NUTS AND WASHERS
Filed July 7, 1960 5 Sheets-Sheet 4
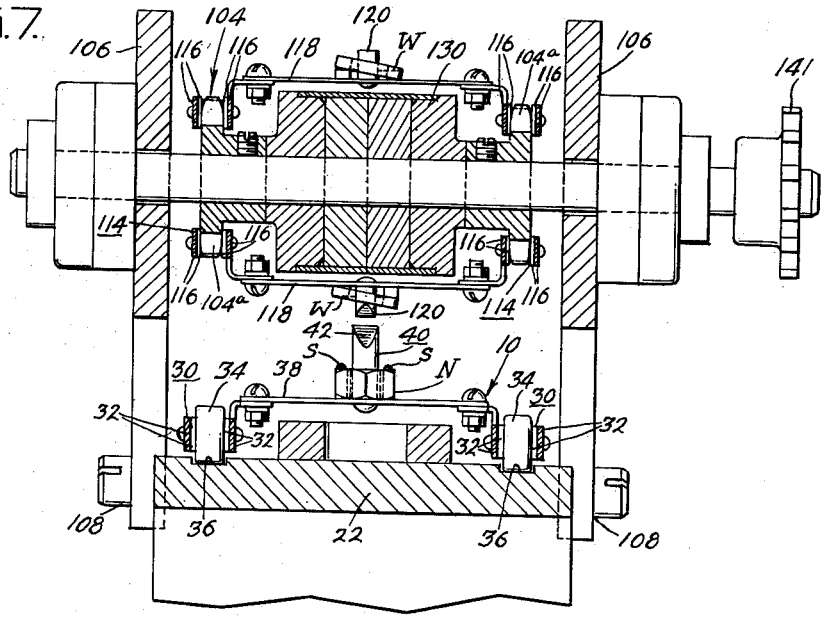
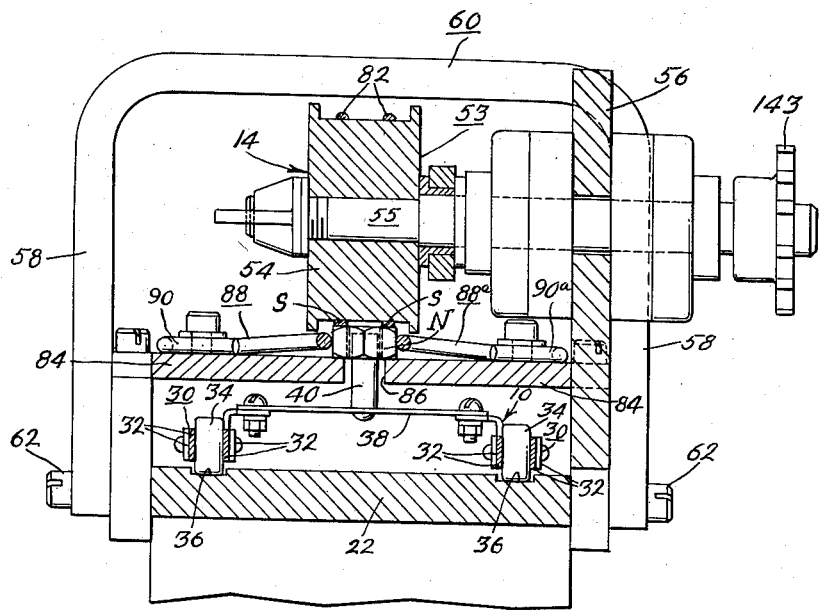
INVENTOR:
ALBERT C. SANDOW
BY Howson & Howson
ATTYS.

June 25, 1963 A. C. SANDOW 3,095,344
APPARATUS FOR ASSEMBLING NUTS AND WASHERS
Filed July 7, 1960 5 Sheets-Sheet 5
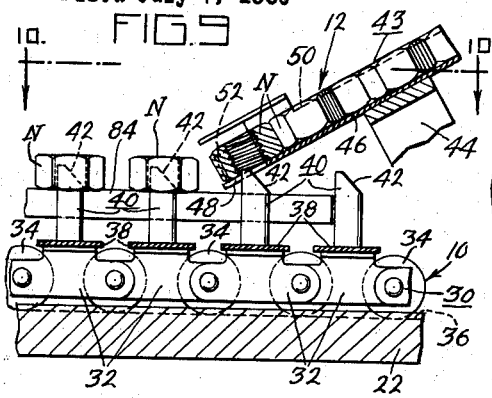
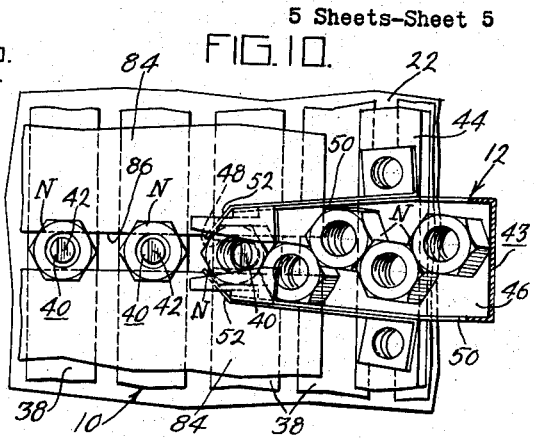
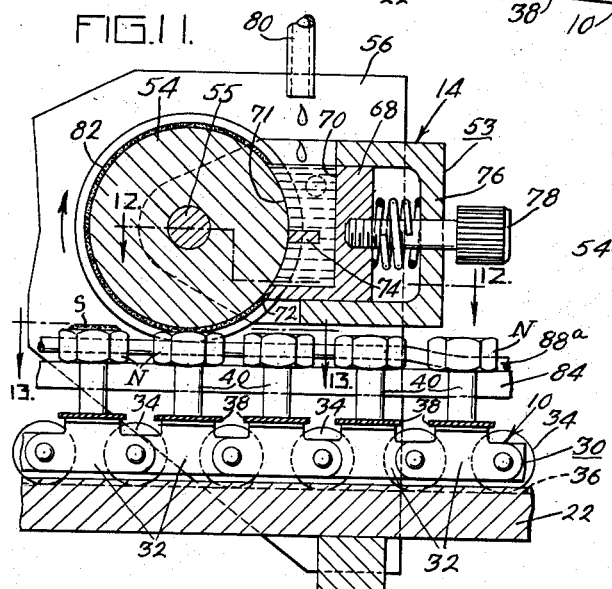
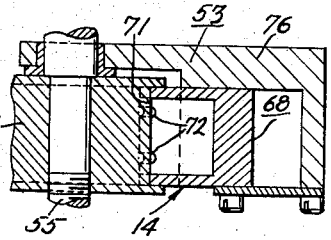
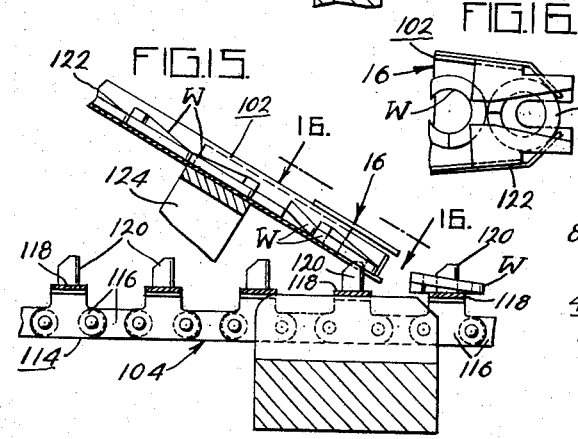
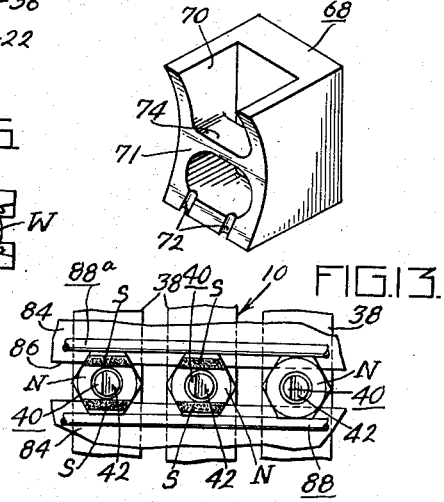
INVENTOR:
ALBERT C. SANDOW
BY
Howson & Howson
ATTYS.

United States Patent Office
3,095,344
Patented June 25, 1963

3,095,344
APPARATUS FOR ASSEMBLING NUTS AND WASHERS
Albert C. Sandow, Hatboro, Pa., assignor, by mesne assignments, to Philadelphia Steel and Wire Corporation, Philadelphia, Pa., a corporation of Pennsylvania
Filed July 7, 1960, Ser. No. 41,365
6 Claims. (Cl. 156—566)

This invention relates broadly to apparatus and method for assembling nuts and washers. More particularly, this invention relates to an improved method and apparatus for associating and assembling nuts and washers into combined units with a bonding substance whereby the assembled nuts and washers are held together as a unit during normal shipping and handling operations and initial application to a bolt.

An object of the present invention is to provide an improved method and apparatus of the above type, which is suitable for a mass-production type operation and can be employed for pre-assembling various types of washers and nuts, including, for example, conventional hex nuts and spring type lock washers. Broadly, the concept of the invention provides for continuously supplying nuts and washers to a main conveyer system, applying predetermined amounts of a suitable bonding substance to a face of each nut and locating and synchronizing the washer feed with the main conveyer system so that a single washer is assembled to each nut with the interposition of a bonding substance therebetween. The bonding must be such that after application to a bolt, upon reaching a predetermined wrenching torque, the bond will be broken to permit proper functioning of the washer.

Figure 5:
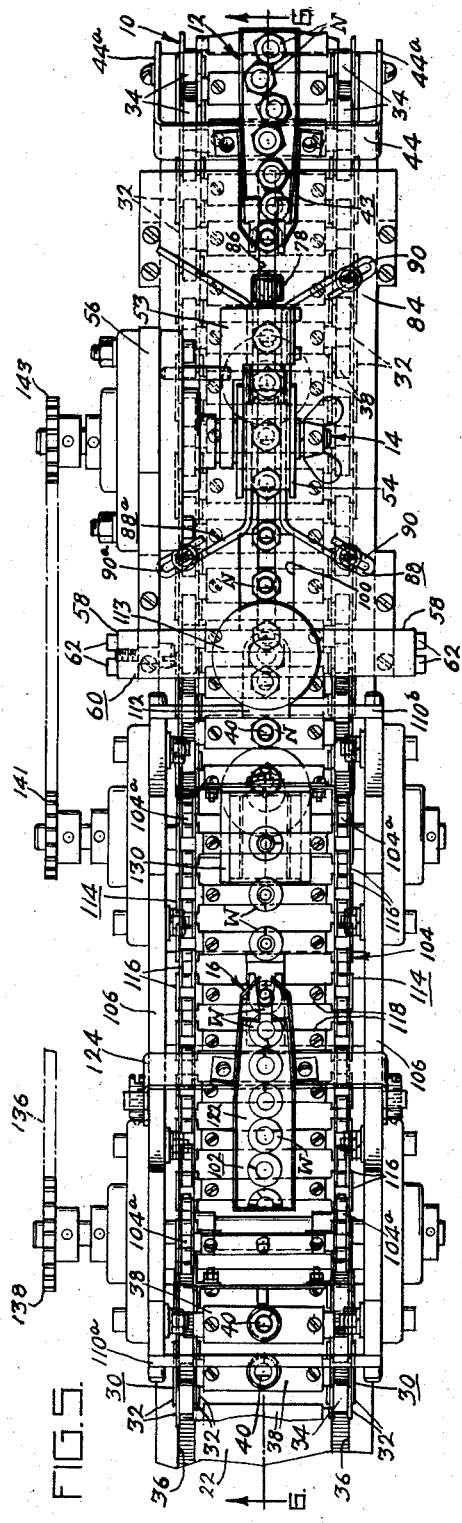
Figure 6:
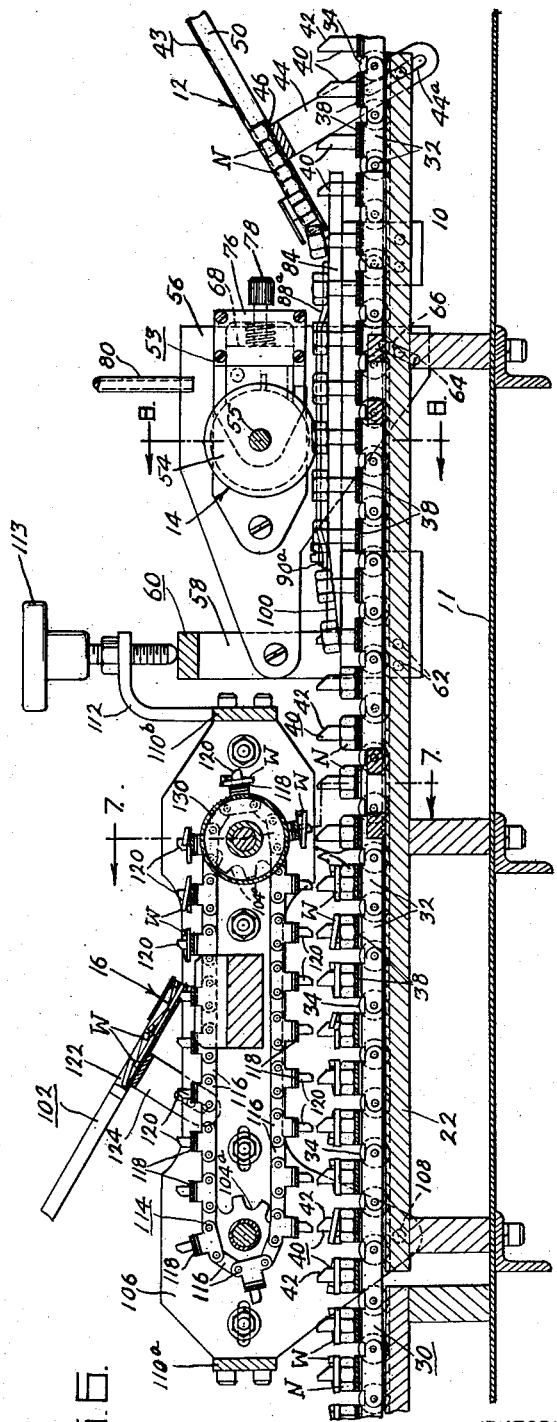

A more detailed description of a method and apparatus of the present invention is hereinafter more fully set forth and described with reference to the accompanying drawings disclosing an illustrative embodiment, in which:

FIG. 1 is an exploded perspective view of a nut and washer before assembly;
FIG. 2 is an enlarged transverse cross-section through an assembled washer and nut;
FIG. 3 is a plan view of a nut and washer assembly apparatus made in accordance with the present invention;
FIG. 4 is a schematic side elevational view of the primary components of the apparatus;
FIG. 5 is an enlarged fragmentary plan view showing the washer and nut feeding stations and the bonding substance applicator;
FIG. 6 is a sectional view taken on line 6—6 of FIG. 5;
FIG. 7 is an enlarged sectional view taken on line 7—7 of FIG. 6;
FIG. 8 is an enlarged sectional view taken on line 8—8 of FIG. 6, showing some of the details of the applicator;
FIG. 9 is an enlarged fragmentary side-elevational view of the nut feed station;
FIG. 10 is a view of the nut feed station taken on line 10—10 of FIG. 9;
FIG. 11 is an enlarged fragmentary side elevational view showing other details of the applicator;
FIG. 12 is a fragmentary sectional view taken on line 12—12 of FIG. 11;
FIG. 13 is a fragmentary sectional view taken on line 13—13 of FIG. 11, showing nut guide members;
FIG. 14 is an enlarged perspective view of an applicator wiper;
FIG. 15 is an enlarged fragmentary side elevational view of the washer feed station;
FIG. 16 is a sectional view taken on line 16—16 of FIG. 15, and
FIG. 17 is an enlarged sectional view taken on line 17—17 of FIG. 3.

Referring to FIGS. 1 and 2, the components to be assembled are shown. The nut N is to have superimposed thereon a lock washer W with the interposition of a bonding substance S in the nature of a heat setting adhesive. The assembled relation is shown in FIG. 2.

The apparatus of the present invention for pre-assembling nuts and washers into an integral unit is shown in a schematic arrangement of components in FIG. 4. Considering the apparatus in terms of function, and with reference to the primary component elements and their respective functions, there is provided a main conveyer, generally designated by the numeral 10, which is suitably supported for movement in an endless path in a frame structure 11. A nut feed station 12 is positioned at one end of the main conveyor 10, and is adapted to continuously supply nuts to the conveyer on demand. The nuts are deposited and located on the conveyer at predetermined spaced intervals in a manner hereinafter described, and transported from the nut feed station 12 to an applicator 14 where a predetermined amount of a suitable bonding substance is applied to one face of the nut. A washer supply station 16, positioned downstream of the applicator, is adapted to be synchronized with the main conveyer so that a single washer is deposited on each of the nuts on the conveyer. Thereafter, the assembld nuts and washers are conveyed to a curing station 18, where heat is applied for a predetermined time to effect the desired bond between the nut and washer. The main conveyer 10 then carries the nut-and-washer units to a collection station 20.

The main conveyer 10 is mounted on the frame structure 11 of the apparatus for movement lengthwise on a horizontally disposed top portion 22 of the frame 11. Drive means which in the present instance comprises a motor 24 is connected to the main conveyer through a suitable transmission system 26 to move the conveyer over the top 22 from right to left with respect to FIG. 4, in an endless path. The drive means is preferably a variable type so that the speed of the conveyer and associated feeds may be selectively controlled. The main conveyer comprises, as shown for example in FIG. 5, two conventional chains 30, 30, each consisting of a plurality of links 32 pivotally connected together and having roller elements 34 mounted at the pivotal connection of the links which engage in spaced channels 36, 36 in the top portion 22 to guide the chain along a predetermined path. Spacer bars 38 interconnect corresponding links of the respective chains. Each of the spacer bars 38 mounts a pin 40 which is tapered at its outer end as at 42 for a purpose explained hereinafter.

The nut feed station includes a tray 43 that is supported above the conveyer 10 at an inclined angle with respect to the table top 22 by means of brackets 44 adjustably secured to the table at their outer ends 44ª to selectively vary the angle of inclination of the tray. A suitable feed mechanism such as a vibrator type, commercially sold under the trade name Syntron, may be mounted adjacent the outer end of the tray to continuously supply nuts to the top of the tray. The nuts slide by gravity down the tray toward the conveyer 10. The tray, as shown in FIGS. 9 and 10, comprises a base portion 46 having a slotted opening 48 at its inner end and a pair of upwardly extending side walls 50 which are bent inwardly at the slotted end of the tray to form spring members 52. The spring members are adjustable so that the space between their outer ends may be selectively varied for a particular size nut. The inner end of the tray 43 is aligned with the pins 40 on the conveyer and spaced therefrom so that the outer tapered ends of the pins 40 engage within the slotted opening 48 of the tray and extend upwardly above the base portion 46. As shown, for example in FIG. 5, the spring members 52 are suitably spaced apart so that they retain a particular sized nut in the tray and spread open to release the nut. In this manner, the pin engages within the central opening of the nut on the end of the tray and withdraws it from the tray.

The nuts are then moved by the pins with the conveyor 10 to the applicator station 14. An applicator 53 is provided at the station which is adapted to deposit predetermined amounts of a suitable bonding substance to each nut as it passes through the station. A suitable adhesive for this purpose is one characterized by a suspension of resins having permanent fluidity and containing no volatile solvents which when subjected to heat forms a coherent plastic mass. The particular applicator illustrated comprises an applicator roller 54 which is rotatably mounted for rotation about an axis transverse to the direction of movement of the conveyor. The applicator roller 54 is mounted on a shaft 55 which is journalled in a roller plate 56, pivotally supported at one end on the arm portions 58 of a generally U-shaped jack bar 60 mounted over the conveyer and attached at its free outer ends as shown at 62 in FIG. 8, to opposite sides of the table top 22. The opposite ends of the roller plate are slotted as at 64 and adjustably secured in place by means of screw 66 engaging through the slotted openings 64 and with the table top. In this manner, the height of the applicator roller 54 may be selectively varied with respect to the conveyor. A wiper 68 is mounted adjacent the applicator roller which, as illustrated, for example, in FIG. 14, is of generally cubical form, having a reservoir 70 formed therein which is open at one side 71 thereof. The open side 71 of the reservoir is curved to conform generally to the shape of the roller and has spaced grooves 72 formed in the bottom wall thereof. A web 74 extending transversely of the wiper is provided, which is adapted to engage the peripheral surface of the roller. The wiper 68 is mounted in a housing 76 and is urged into engagement with the peripheral surface of the roller by means of a spring biased adjusting member 78.

The top end of the reservoir 70 is open so that a continuous supply of a bonding substance may be supplied thereto through a tube 80 connected to a supply reservoir. In operation, as the roller is rotated, for example, in clockwise direction, the bonding substance is caused to flow through the grooves 72 in the bottom wall of the wiper and deposit beads 82 of the bonding substance on the outer peripheral surface of the roller 54. The web 74 serves to wipe the surface of the roller clean, so that the bead on the applicator roller is wiped clean at this point, and the bonding substance is continually mixed with fresh material coming into the reservoir.

One of the features of the present invention is the provision of means in the system for insuring that predetermined amounts of the bonding substance are applied to selected portions of the nut as it passes through the applicator station. In the present instance, this is accomplished by mounting a base plate 84 between the conveyor and the applicator roller 54, which extends from the nut feed tray 43 to a point downstream of the applicator station. As illustrated in the drawings, the base plate 84 is generally rectangular, having a longitudinally-extending slotted opening 86 therein, through which the pins on the conveyor project. In this manner, as the pins 40 withdraw each nut from the nut tray onto the base plate 84, the nuts are drawn along the base plate with a face thereof extending upwardly. As shown in FIG. 8, the pins 40 project into the opening of the nut but do not protrude above the upwardly extending face thereof.

Means are provided for aligning the nuts in a predetermined manner as they pass through the applicator station, so that predetermined amounts of the bonding substance are applied to spaced parallel areas on one face of each nut. As illustrated, for example in FIG. 5, this means comprises a pair of guide members forming a restricted channel therebetween which runs parallel to the slotted opening 86 in the base plate, and serves to align the nut in the desired manner. In the embodiment illustrated, the guide members comprise a pair of generally U-shaped wires 88, 88ᵃ, one of which, 88 is reversely bent at its free outer ends to form loop portions 90 by which it is adjustably secured to the top of the base plate. The other wire, 88ᵃ, is reversely bent at one of its free outer ends 90ᵃ and secured in a similar fashion, while the other free end of the wire is free to float so that the channel is flexible to a degree, and precludes binding of the nuts therein. The wires are adjustably mounted on the base plate so that the width of the channel may be selectively adjusted depending on the size of the nut being fed through the system. Accordingly, as each nut moves along the base plate through the channel and under the applicator roller, the top face thereof engages the bead of bonding substance and a strip of adhesive is deposited along parallel areas of the top face of the nut.

The nuts then are moved by the conveyor down a tapered front end 100 of the base plate defining a ramp toward the washer feed station 16. A washer feeder mechanism 102, as shown, for example, in FIG. 6, which is aligned longitudinally with respect to the direction of movement of the conveyer is adapted to convey and position a single washer W on each of the nuts on the conveyor. In the present instance the washer feed mechanism 102 comprises an endless chain conveyor 104, rotatably mounted between sprockets 104ᵃ which are suitably connected to drive means for actuating the conveyer. The sprockets 104ᵃ are journalled in a conveyor housing consisting of a pair of spaced side plates 106 that are pivotally mounted at their outer ends to the table top at 108. A pair of end plates 110ᵃ, 110ᵇ are secured to outer ends of the side plates to maintain them in spaced relation. The free ends of the side plates are adjustably supported with respect to the conveyor by means of a bracket 112 secured to the end plate 110ᵇ and an adjusting screw 113 threadedly mounted in the bracket 112 and engaging the top portion of the jack bar 60. The chain conveyor 104 is a conventional type, comprising a pair of chains 114, 114, each consisting of a plurality of links 116 pivotally connected together. The chains 114 are in spaced-apart relation and interconnected by means of spacer bars 118 mounting outwardly-extending stud members 120 which are adapted to receive the washer elements. In the present instance, the spacer bars 118 are provided for every other link of the chain. A washer feed tray 122 is mounted on the conveyor which is adapted to feed a supply of washers W, one by one, to the stud members 120 of the chain conveyor. The washer feed tray 122 is constructed similar to the nut feed tray, and is supported at a predetermined inclined angle with respect to the horizontal table top 22 by means of brackets 124 adjustably secured to the side plates 106 of the washer conveyor system. In this manner, as illustrated in FIG. 6, as the conveyer rotates in a clockwise direction, each of the studs 120 engages and picks up a single washer from the tray. The washers are carried around the conveyor in a clockwise direction, and are retained in position on the stud members on their downward movement toward the main conveyor by means of a magnetized drum 130 which rotates with the sprockets 104ᵃ. The spacer bars 118 engage the magnetic drum 130 as the bars are moved about the periphery of the drum, and the magnetic force is of sufficient magnitude to retain the washers on the studs until the studs have been moved to a position overlying and aligned with the pins 40 on the main conveyer. At this point, the washer element moves out of the magnetic field and drops onto the nut positioned on a pin 40 on the main conveyor.

Thereafter the so assembled nuts and washers are conveyed on the main conveyor to the curing station 18, wherein the desired bonding of the cement or adhesive takes place. The curing station may be a conventional induction type heater H, having suitable controls for selectively varying the heat generated, depending upon the speed at which the conveyer is moved through the induction heater. Any other suitable heating means could be used.

While various systems of sequence control might be employed to effect continuous cyclic operation and synchronism of the various components to achieve the type of operation described, one such method of control is schematically illustrated in FIG. 4. As illustrated, a motor 24 having a drive shaft 132 is connected by means of a belt pulley to a gear reduction box 134. A chain drive 136 connects the output shaft of the gear reduction box to the drive sprocket 138 of the washer feed conveyer. A similar chain drive 140 connects the drive sprocket 142 for actuating the main chain conveyer to the output shaft of the gear reduction box. A chain linkage also connects the driven sprocket 141 of the washer conveyer system to a sprocket 143 mounted on the applicator drum shaft to actuate the same. The drive sprockets of the main conveyer and the washer conveyer are suitably dimensioned so that the linear speeds of the conveyers with respect to the table top are the same, so that the pins on the corresponding conveyers can be co-actingly aligned and moved as shown, for example, in FIG. 6.

While a particular embodiment of the present invention has been illustrated and described herein, it is, of course, to be understood that changes and modifications in various parts of the apparatus and in the manner and sequence of the method of assembling nuts and washers may be made within the scope of the present invention and the following claims.

I claim:

1. In a system for assembling nuts and washers into combined units, a moving conveyer, a nut feed station positioned adjacent the conveyer and operable for feeding nuts to the conveyer at predetermined spaced intervals, an adhesive applicator positioned adjacent the conveyer downstream of the nut feed station operable for depositing a heat-settable adhesive substance on a face of each of said nuts on the conveyer adjacent parallel side edges thereof, means for aligning the nuts in a predetermined manner with respect to the direction of movement of the conveyer and prevent rotation thereof as the nuts pass through the applicator, a washer feed station adjacent the conveyer downstream of the adhesive applicator operable for supplying washers at a predetermined rate in synchronization with the nut feed and the conveyer for assembling a single washer on the adhesive substance on the face of each said nut, means engaging through the nut and washer of each unit for concentrically aligning the nut and washer of each of the combined units and heating means for heating the combined units to a predetermined temperature to set the adhesive whereby a temporary bond is provided between the nut and washer of each of the combined units.

2. Apparatus for pre-assembling nuts and spring-type lock washers into combined units, comprising continuous moving conveyer means, means for positioning nuts on the conveyer at spaced intervals, an adhesive applicator for depositing predetermined amounts of a heat-settable adhesive substance on a face of each of the nuts adjacent parallel side edges thereof, means in synchronization with the conveyer operable for positioning a single washer on the adhesive substance on said face of each of the nuts on the conveyer, means engaging through the nut and washer of each unit for concentrically aligning the nut and washer of each of the combined units and heating means for heating the combined units to set the adhesive whereby a temporary bond is provided between the nut and washer of each of the combined units.

3. Apparatus for pre-assembling nuts and washers into combined units, comprising, movable conveyer means, means for positioning the nuts on the conveyer at predetermined spaced intervals, an adhesive applicator for depositing an adhesive substance on a face of each of said nuts, means on said conveyer adjacent the adhesive applicator for aligning the nuts in a predetermined manner with respect to the direction of movement of the conveyer to facilitate application of a bead of adhesive to spaced outer side edges of the nuts, means in synchronization with the conveyer operable for positioning a single washer on the adhesive substance on said face of each of the nuts on the conveyer and means engaging through the nut and washer of each unit for concentrically aligning the nut and washer of each of the combined units.

4. Apparatus as claimed in claim 3 wherein said means for aligning the nuts comprises a pair of spaced members on the conveyor defining a channel therebetween, said spaced members engaging parallel side edges of each of the nuts to prevent the rotation thereof in said channel.

5. Apparatus for assembling first and second annular type fastener elements into combined units, comprising movable conveyer means, means for positioning said first type fastener elements on the conveyer at spaced intervals, an adhesive applicator for depositing predetermined amounts of an adhesive substance to a face of each of said first type fastener elements, said applicator including an applicator roller mounted for rotation about an axis transverse to the direction of movement of said conveyer, means for rotating said roller, a reservoir for said adhesive material mounted adjacent said applicator roller, means defining a pair of spaced discharge openings in said reservoir whereby upon rotation of the roller axially spaced circumferentially extending beads of the adhesive substance are deposited on the outer peripheral surface of said roller, said roller being spaced from said conveyer and operable to transfer a bead of adhesive to spaced outer side portions of the face of each of said first type fastener elements, means in synchronization with the conveyer operable for superimposing said second type fastener elements on the adhesive substance on the face of each of said first type fastener elements, whereby a temporary bond is provided between the first and second annular elements of each of the bond units, and means engaging through said fastener elements of each unit for concentrically aligning the fastener elements of each of the combined units.

6. Apparatus for assembling nuts and washers into combined units, comprising first conveyer means, said first conveyer means including a plurality of spaced apart pins which are tapered at their outer ends, a nut supply station disposed adjacent one end of said first conveyer, each of said pins operable to withdraw a nut from said nut supply station upon passage therethrough, an adhesive applicator downstream of said nut supply station for depositing predetermined amounts of an adhesive substance on spaced outer side edge portions of the face of each nut, second conveyer means overlying said first conveyer means downstream of said adhesive applicator, a washer supply station operatively associated with said second conveyer means, said second conveyer means including a plurality of spaced apart studs tapered at their outer ends, each of said studs operable to withdraw a washer from said washer supply station upon passage therethrough, and means synchronizing said first and second conveyers whereby a single washer is superimposed on the adhesive substance on the face of each of said nuts, each of said pins operable to concentrically align the nut and washer of each of said combined units.

References Cited in the file of this patent

UNITED STATES PATENTS

| | | |
|---|---|---|
| 2,545,704 | Raffel | Mar. 20, 1951 |
| 2,635,670 | Winberg | Apr. 21, 1953 |
| 2,695,650 | Weisenburg | Nov. 30, 1954 |
| 2,747,648 | Bingham et al. | May 29, 1956 |
| 2,817,620 | Golick et al. | Dec. 24, 1957 |
| 2,834,394 | Sharn et al. | May 13, 1958 |